(12) United States Patent
Oh

(10) Patent No.: US 11,446,126 B2
(45) Date of Patent: Sep. 20, 2022

(54) DENTAL FLOSS MEMBER AND DENTAL FLOSS HOLDER

(71) Applicant: Bong kyun Oh, Cheongju-si (KR)

(72) Inventor: Bong kyun Oh, Cheongju-si (KR)

( * ) Notice: Subject to any disclaimer, the term of this patent is extended or adjusted under 35 U.S.C. 154(b) by 344 days.

(21) Appl. No.: 15/764,325

(22) PCT Filed: Dec. 15, 2016

(86) PCT No.: PCT/KR2016/014702
§ 371 (c)(1),
(2) Date: Mar. 29, 2018

(87) PCT Pub. No.: WO2018/110738
PCT Pub. Date: Jun. 21, 2018

(65) Prior Publication Data
US 2019/0175318 A1    Jun. 13, 2019

(30) Foreign Application Priority Data
Dec. 14, 2016  (KR) .......................... 10-2016-0170184

(51) Int. Cl.
*A61C 15/04*   (2006.01)
(52) U.S. Cl.
CPC ............ *A61C 15/046* (2013.01); *A61C 15/04* (2013.01); *A61C 15/043* (2013.01); *A61C 15/041* (2013.01)
(58) Field of Classification Search
CPC ............ A61C 15/00; A61C 15/04–043; A61C 15/045–048
USPC ........ 132/309, 323–327; D28/65, 66, 67, 68
See application file for complete search history.

(56) References Cited

U.S. PATENT DOCUMENTS

| | | | | |
|---|---|---|---|---|
| 1,279,026 A | * | 9/1918 | Sievers | ................ A61C 15/046 132/324 |
| 2,873,749 A | * | 2/1959 | Borgtor | ................ A61C 15/046 132/323 |
| 3,747,611 A | * | 7/1973 | Bennington | ......... A61C 15/043 132/325 |
| 3,858,594 A | | 1/1975 | Ensminger | |

(Continued)

FOREIGN PATENT DOCUMENTS

| | | | | |
|---|---|---|---|---|
| AT | 518581 A1 | * | 11/2017 | ............. A45D 29/00 |
| DE | 9406237 U1 | * | 9/1994 | ........... A61C 15/046 |

(Continued)

OTHER PUBLICATIONS

Notification of Reason for Refusal dated Nov. 6, 2018 from the Korean Patent Office Re. Application No. 10-2016-0170184. (7 pages).

(Continued)

*Primary Examiner* — Jacqueline T Johanas
*Assistant Examiner* — Sarah Woodhouse

(57) ABSTRACT

A dental floss member and a dental floss holder are disclosed. The dental floss member includes a linear type dental floss having a predetermined length, a first fixer disposed at one end of the dental floss, and a second fixer disposed at the other end of the dental floss. The dental floss holder includes a body having a first corresponding fixer to which the first fixer is fixed and a mounting part on which a section for use of the dental floss is mounted, and a second corresponding fixer disposed at the body and to which the second fixer is fixed.

1 Claim, 24 Drawing Sheets

(56) References Cited

U.S. PATENT DOCUMENTS

| | | | | |
|---|---|---|---|---|
| 4,016,892 A * | 4/1977 | Chodorow | A61C 15/043 | 132/323 |
| 4,034,770 A * | 7/1977 | Trecker | A61C 15/046 | 132/321 |
| 4,162,687 A * | 7/1979 | Lorch | A61C 15/046 | 132/323 |
| 4,338,957 A * | 7/1982 | Meibauer | A61C 15/046 | 132/322 |
| 4,550,741 A * | 11/1985 | Krag | A61C 15/041 | 132/321 |
| 4,574,823 A | 3/1986 | Uriss | | |
| 4,655,233 A * | 4/1987 | Laughlin | A61C 15/046 | 132/323 |
| 4,807,651 A * | 2/1989 | Naydich | A61C 15/046 | 132/323 |
| 5,094,256 A * | 3/1992 | Barth | A61C 15/00 | 132/322 |
| 5,170,809 A * | 12/1992 | Imai | A61C 15/047 | 132/322 |
| 5,183,064 A * | 2/1993 | Barth | A61C 15/00 | 132/321 |
| 5,199,452 A * | 4/1993 | Cheng | A61C 15/043 | 132/323 |
| 5,327,977 A * | 7/1994 | Lukashuk | A01B 1/06 | 132/324 |
| 5,881,745 A * | 3/1999 | Landis | A61C 15/046 | 132/323 |
| 5,931,171 A * | 8/1999 | Landis | A61C 15/046 | 132/323 |
| 6,604,534 B2 * | 8/2003 | Hill | A61C 15/041 | 132/321 |
| 7,464,716 B1 * | 12/2008 | Nygren, Jr. | A61C 15/047 | 132/322 |
| 9,271,814 B2 * | 3/2016 | Allen | A61C 15/046 | |
| 2002/0185149 A1 * | 12/2002 | Ali | A61C 15/046 | 132/324 |
| 2004/0244815 A1 * | 12/2004 | Lee | A61C 15/043 | 132/323 |
| 2005/0263169 A1 * | 12/2005 | Romine | A61C 15/043 | 132/321 |
| 2007/0012332 A1 * | 1/2007 | Ponzini | A61C 15/041 | 132/321 |
| 2010/0018547 A1 * | 1/2010 | Roemuss | A61B 17/244 | 132/323 |
| 2011/0073131 A1 * | 3/2011 | Hsu | A61C 15/042 | 132/323 |
| 2012/0067367 A1 * | 3/2012 | Stewart | A61C 15/048 | 132/326 |
| 2012/0180809 A1 * | 7/2012 | Bai | A61C 15/046 | 132/327 |
| 2013/0160790 A1 * | 6/2013 | Yap | A61C 15/048 | 132/324 |
| 2014/0182618 A1 * | 7/2014 | Jafari Dehnavi | A61C 15/046 | 132/325 |
| 2016/0346067 A1 * | 12/2016 | Pines | A61C 15/042 | |
| 2017/0290639 A1 * | 10/2017 | Kaufman | A61C 19/00 | |
| 2020/0085550 A1 * | 3/2020 | Horton | A61C 15/048 | |

FOREIGN PATENT DOCUMENTS

| | | | | |
|---|---|---|---|---|
| DE | 29503229 U1 * | 4/1995 | | A61C 15/046 |
| EP | 0552777 | 7/1993 | | |
| EP | 2499989 A1 * | 9/2012 | | A61C 3/06 |
| FR | 2648700 A1 * | 12/1990 | | A61C 17/0202 |
| GB | 778564 A * | 7/1957 | | A61C 15/046 |
| GB | 2272161 A * | 5/1994 | | A61C 15/046 |
| JP | 06-058923 | 8/1994 | | |
| JP | 08-501964 | 3/1996 | | |
| JP | 11-267141 | 10/1999 | | |
| KR | 20-0441751 | 9/2008 | | |
| KR | 10-1121950 | 3/2012 | | |
| KR | 10-2015-0016027 | 2/2015 | | |
| KR | 10-1579597 | 12/2015 | | |
| KR | 10-1635363 | 7/2016 | | |
| WO | WO-2004084759 A2 * | 10/2004 | | A61C 15/04 |
| WO | WO-2006117553 A1 * | 11/2006 | | A61C 15/041 |
| WO | WO 2011/141623 | 11/2011 | | |
| WO | WO-2011141623 A1 * | 11/2011 | | A61C 15/046 |
| WO | WO-2015176261 A1 * | 11/2015 | | A61C 15/04 |
| WO | WO-2015176261 A1 * | 11/2015 | | A61C 15/04 |
| WO | WO-2016052969 A1 * | 4/2016 | | A61C 15/04 |
| WO | WO-2016074517 A1 * | 5/2016 | | A61C 15/00 |

OTHER PUBLICATIONS

International Search Report and the Written Opinion dated Sep. 8, 2017 From the International Searching Authority Re. Application No. PCT/KR2016/014702 and its Translation of Search Report Into English. (12 Pages).

Notice of Reason for Rejection dated Jun. 22, 2020 From the Japan Patent Office Re. Application No. 2019-552432.

Notification of Office Action and Search Report dated Mar. 27, 2020 From the State Intellectual Property Office of the People's Republic of China Re. Application No. 201680080032.4. (8 Pages).

Requisition by the Examiner dated Apr. 20, 2020 From the Innovation, Science and Economic Development Canada, Canadian Intellectual Property Office Re. Application No. 3,043,589. (4 Pages).

Supplementary European Search Report and the European Search Opinion dated Apr. 8, 2020 From the European Patent Office Re. Application No. 16923765.8. (9 Pages).

Written Opinion dated Apr. 30, 2020 From the Intellectual Property Office of Singapore, IPOS Re. Application No. 11201904904S.

International Search Report dated Sep. 8, 2017 From Korean Intellectual Property Office Re. Application No. PCT/KR2016/014702. (3 Pages).

Notice of Reason for Rejection dated Feb. 22, 2021 From the Japan Patent Office Re. Application No. 2019-552432. (3 Pages).

* cited by examiner (320 : 321~322)

DENTAL FLOSS MEMBER AND DENTAL FLOSS HOLDER

RELATED APPLICATIONS

This application is a National Phase of PCT Patent Application No. PCT/KR2016/014702 having International filing date of Dec. 15, 2016, which claims the benefit of priority of Korean Patent Application No. 10-2016-0170184 filed on Dec. 14, 2016. The contents of the above applications are all incorporated by reference as if fully set forth herein in their entirety.

FIELD AND BACKGROUND OF THE INVENTION

The present disclosure relates to a dental floss member and a dental floss holder, and more particularly, to a dental floss member which may be used independently and a dental floss holder for mounting such a dental floss member.

Generally, the use of dental floss is very important for dental health, as there is a report that using dental floss prolongs the life of teeth by 6.2 years.

Nonetheless, the use of dental floss is limited, and this is due to difficulty in using dental floss and lack of promotion.

In recent years, although the importance of dental floss has fortunately been emphasized and the use thereof has been gradually increased, technologies related to improving the usability of dental floss are still insufficient.

FIG. 1 illustrates an annular dental floss according to one embodiment, and FIG. 2 is a use state view thereof.

A conventional dental floss member (1) illustrated in FIGS. 1 and 2 is configured with both ends of a dental floss (3) buried in a quadrilateral upper surface of a dental floss tie (2). When the dental floss member (1) is being used, as illustrated in FIG. 2, the dental floss tie (2) is placed at the bottom, and flossing is performed using an upper section of the dental floss (3) while both sides of the dental floss are gripped by hands.

Although the conventional dental floss member (1) is fundamentally used independently without a dental floss holder, the dental floss member (1) may also be used by being mounted on a dental floss holder as necessary.

In this case, since both ends of the dental floss (3) are buried only in an upper side of the dental floss tie (2) and thus the dental floss tie (2) is not adhered to the dental floss holder and hangs loosely when the dental floss (3) is pulled tight, the dental floss tie (2) is prone to get stuck inside the mouth and interfere with flossing.

Therefore, the conventional dental floss member (1) is very unsuitable to be applied to the dental floss holder.

FIG. 3 is a perspective view illustrating an example of a conventional dental floss holder.

A conventional dental floss holder (4) illustrated in FIG. 3 includes a handle (5), a holder part (6) integrally formed with an upper end of the handle (5) in the drawing, and a dental floss (7) having both ends buried and fixed to inner surfaces of the holder (6).

In the case of the above-described conventional dental floss holder (4), the dental floss (7) is stretched or becomes loose during use as the dental floss (7) is gradually withdrawn from the holder part (6).

When the dental floss (7) is stretched as above, flossing cannot be performed, and thus the dental floss holder (4) is discarded. This causes environmental pollution as well as economic loss.

SUMMARY OF THE INVENTION

It is an aspect of the present disclosure to provide a dental floss member which can easily be mounted on a dental floss holder, whose tension can be easily adjusted, and which can be used independently.

It is another aspect of the present disclosure to provide a dental floss holder which is used for mounting the above-described dental floss member and is capable of readjusting tension of dental floss when the dental floss mounted thereon is stretched during use, thereby increasing effectiveness of the dental floss.

It should be noted that objects of the present disclosure are not limited to the above-described objects, and other objects of the present disclosure will be apparent to those skilled in the art from the following descriptions.

According to an aspect of the present disclosure for achieving the above objects, there is provided a dental floss member including a linear type dental floss having a predetermined length, a first fixer disposed at one end of the dental floss, and a second fixer disposed at the other end of the dental floss.

Preferably, the first fixer may be a holding object having a thickness larger than that of the dental floss to be held and fixed into a slot provided in a dental floss holder.

Preferably, the second fixer may include a ratchet engaged with a corresponding ratchet of the dental floss holder.

Preferably, the second fixer in an annular shape may be formed at the other end of the dental floss and be hung and fixed onto a hook provided on the dental floss holder.

Preferably, the second fixer may be formed in an arrowhead shape and be held and fixed into a fixing groove provided in the dental floss holder.

According to another aspect of the present disclosure, there is provided a dental floss holder for mounting a dental floss member that includes a linear type dental floss having a predetermined length, a first fixer disposed at one end of the dental floss, and a second fixer disposed at the other end of the dental floss, the dental floss holder including a body having a first corresponding fixer to which the first fixer is fixed and a mounting part on which a section for use of the dental floss is mounted, and a second corresponding fixer disposed at the body and to which the second fixer is fixed.

Preferably, the first corresponding fixer may include a slot in which the first fixer in the form of a holding object is held and fixed.

Preferably, the second corresponding fixer may be a corresponding ratchet engaged with a ratchet of the second fixer and whose movement toward the mounting part is limited while whose movement away from the mounting part is permitted.

Preferably, the second corresponding fixer may be a hook on which the second fixer in an annular shape provided at the other end of the dental floss is hung and fixed.

Preferably, the second corresponding fixer may be a fixing groove into which the second fixer in an arrowhead shape is inserted.

According to still another aspect of the present disclosure, there is provided a dental floss member including an annular dental floss in a closed loop shape, a dental floss tie to which both ends of the annular dental floss are bound, and a ratchet provided in a length direction of the dental floss tie.

According to yet another aspect of the present disclosure, there is provided a dental floss holder for mounting a dental floss member that includes an annular dental floss in a closed loop shape, a dental floss tie to which both ends of the annular dental floss are bound, and a ratchet provided in a length direction of the dental floss tie, the dental floss holder including a holder body having a mounting part on which a section for use of the annular dental floss is mounted, and a tie fixing part provided on the holder body and to which the dental floss tie is fixed.

Preferably, a ratchet may be provided on the dental floss tie, and a corresponding ratchet engaged with the ratchet may be provided on the tie fixing part.

Preferably, the tie fixing part may be in the form of a tunnel, and the corresponding ratchet may be provided in the tunnel.

Preferably, the corresponding ratchet may be formed at a ratchet plate that is attachable to and detachable from the tie fixing part.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which.

DESCRIPTION OF SPECIFIC EMBODIMENTS OF THE INVENTION

Hereinafter, exemplary embodiments of the present disclosure will be described in detail with reference to the accompanying drawings.

A dental floss member 10 illustrated in FIG. 4 according to a first embodiment includes a linear type dental floss 11 having a predetermined length, a first fixer 12 disposed at one end of the dental floss 11 to fix the one end of the dental floss to a dental floss holder which will be described below, and a second fixer 13 disposed at the other end of the dental floss 11 to fix the other end of the dental floss to the dental floss holder which will be described below.

Here, the first fixer 12 may be a holding object having a thickness larger than that of the dental floss to be held and fixed into a slot provided in the dental floss holder which will be described below.

As an example, the holding object may be in the shape of a ball.

For example, the ball-shaped first fixer 12 may have a through-hole formed therein for the one end of the dental floss 11 to pass therethrough and be tied such that the dental floss 11 and the first fixer 12 are integrated. In another example, the one end of the dental floss 11 may be buried and formed in the first fixer 12 such that the dental floss 11 and the first fixer 12 are integrated.

Figure 1:
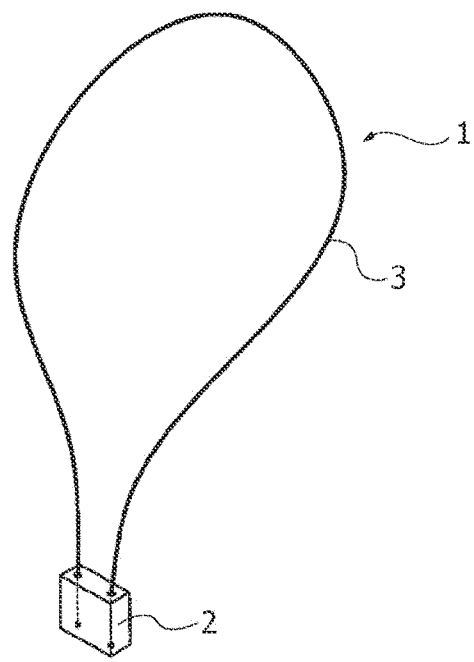
FIG. 1 is an exemplary view of a conventional annular dental floss.
Figure 2:
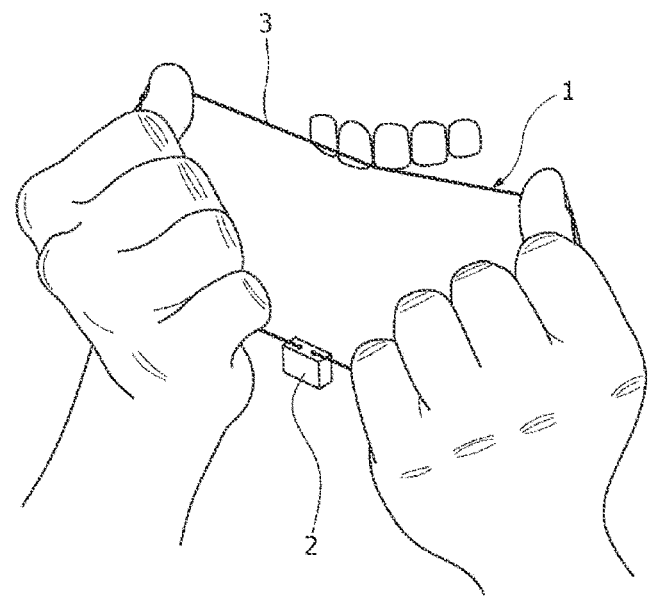
FIG. 2 is a use state view of the conventional annular dental floss shown in FIG. 1.
Figure 3:
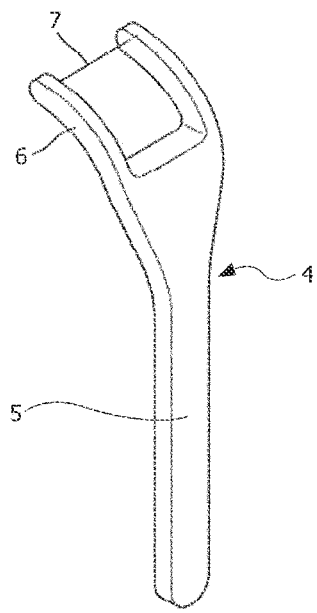
FIG. 3 is an exemplary view of a conventional dental floss holder.
Figure 4:
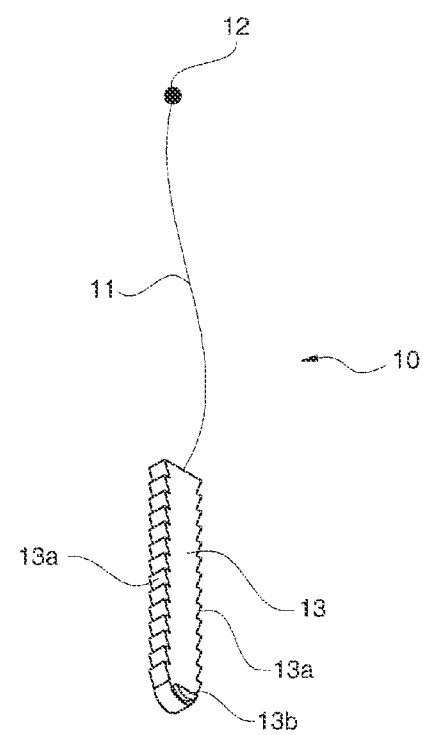
FIG. 4 is a first embodiment of a linear dental floss member according to the present disclosure.

As shown in FIG. 4, the second fixer 13 may have a structure in which a ratchet 13a is provided on each of both side surfaces thereof.

Further, a pulling part 13b in the shape of a groove or protrusion for a pulling operation of the second fixer 13 may be provided on a surface, i.e., a front surface of the second fixer 13.

Figure 5:
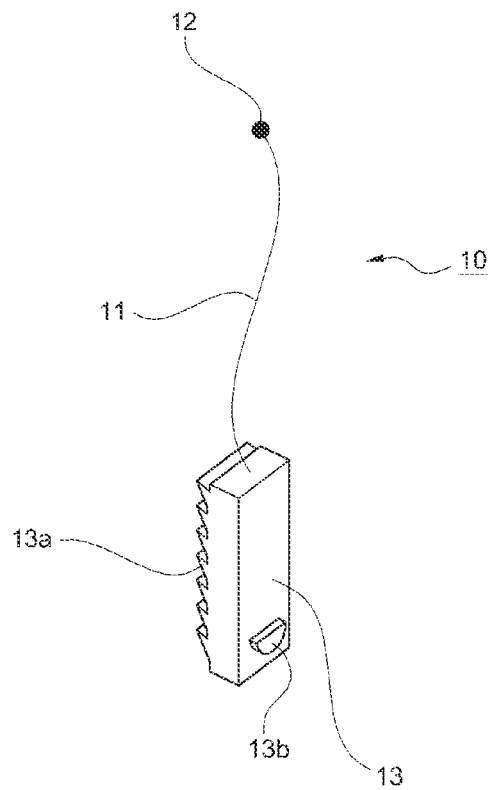
FIG. 5 is a second embodiment of a linear dental floss member according to the present disclosure.

FIG. 5 is a second embodiment of a dental floss member according to the present disclosure.

A dental member 10 illustrated in FIG. 5 is the same as the first embodiment above in terms of structures of a dental floss 11 and a first fixer 12 but is different therefrom in terms of a structure of a second fixer 13. Here, the second fixer 13 may have a ratchet 13a provided on a rear surface thereof.

A pulling part 13b in the shape of a groove or protrusion for a pulling operation of the second fixer 13 may be provided on a surface of the second fixer 13.

Figure 6:
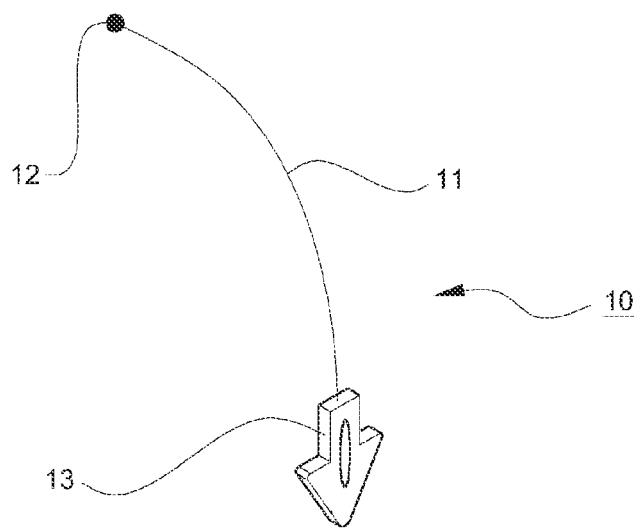
FIG. 6 is a third embodiment of a linear dental floss member according to the present disclosure.

FIG. 6 is a third embodiment of a dental floss member according to the present disclosure.

A dental floss member 10 illustrated in FIG. 6 is the same as the first and second embodiments in terms of structures of a dental floss 11 and a first fixer 12 but is different therefrom in terms of a structure of a second fixer 13. Here, the second fixer 13 may have an arrowhead shape. In this case, the arrowhead-shaped second fixer 13 may be held and fixed into a fixing groove provided on a dental floss holder.

Figure 7:
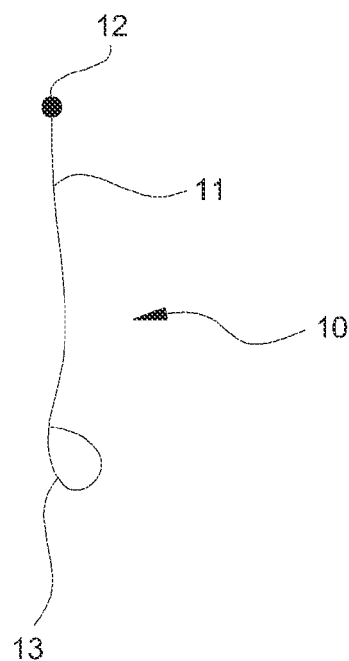
FIG. 7 is a fourth embodiment of a linear dental floss member according to the present disclosure.

FIG. 7 is a fourth embodiment of a dental floss member according to the present disclosure.

A dental floss member 10 illustrated in FIG. 7 is the same as the first to third embodiments in terms of structures of a dental floss 11 and a first fixer 12, but is different therefrom in terms of a structure of a second fixer 13. Here, a second fixer 13 in a ring shape may be formed at the other end of the dental floss 11. In this case, the ring-shaped second fixer 13 may be hung and fixed onto a hook provided on a dental floss holder.

[Linear Dental Floss Member Dental Floss Holder]

Figure 8:
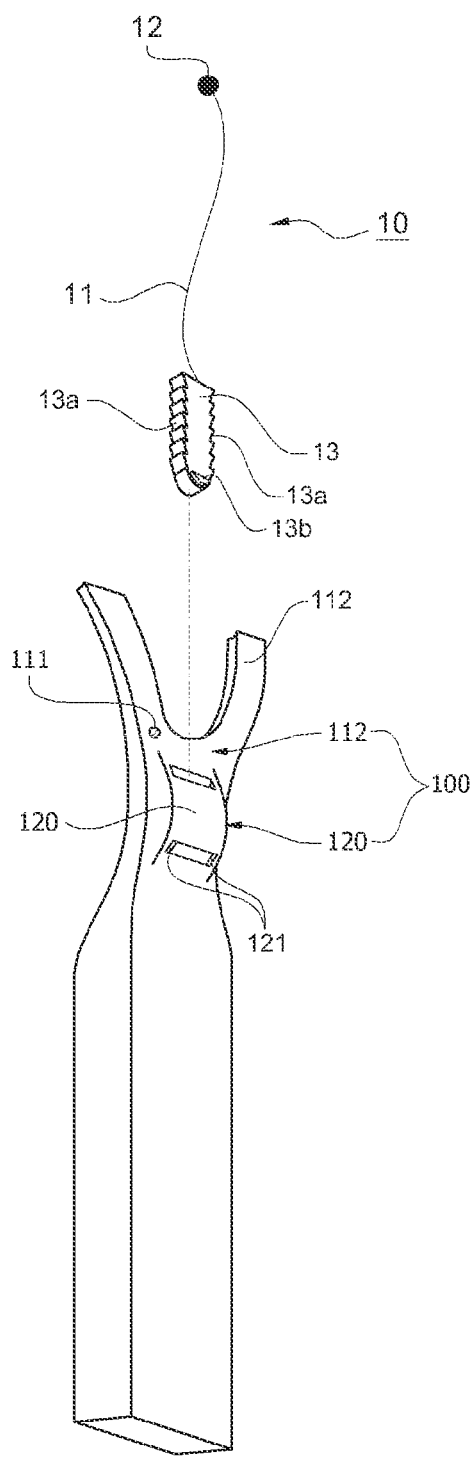
FIG. 8 is a first embodiment of a linear dental floss member dental floss holder according to the present disclosure.
Figure 9A:
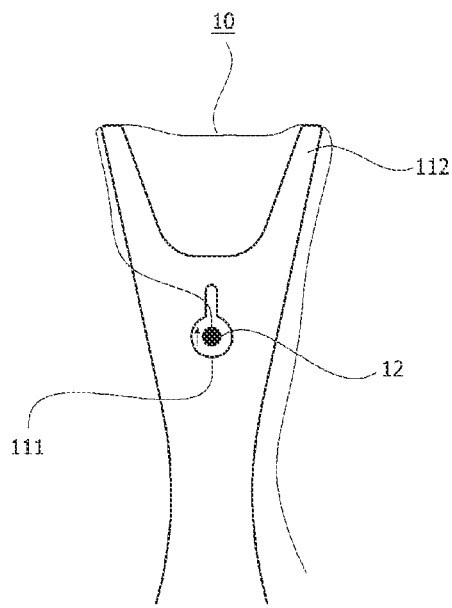
FIGS. 9A and 9B are exemplary views of a first corresponding fixer of the linear dental floss member dental floss holder according to the present disclosure.
Figure 9B:
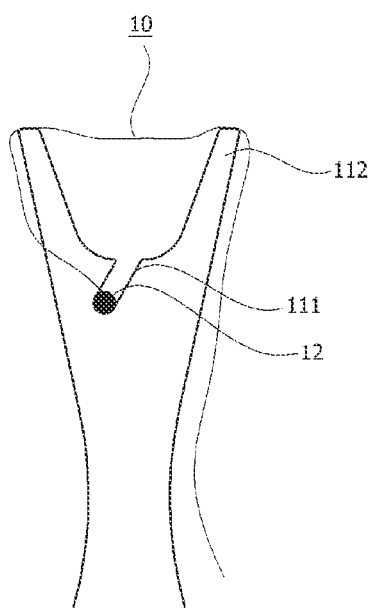
Figure 10:
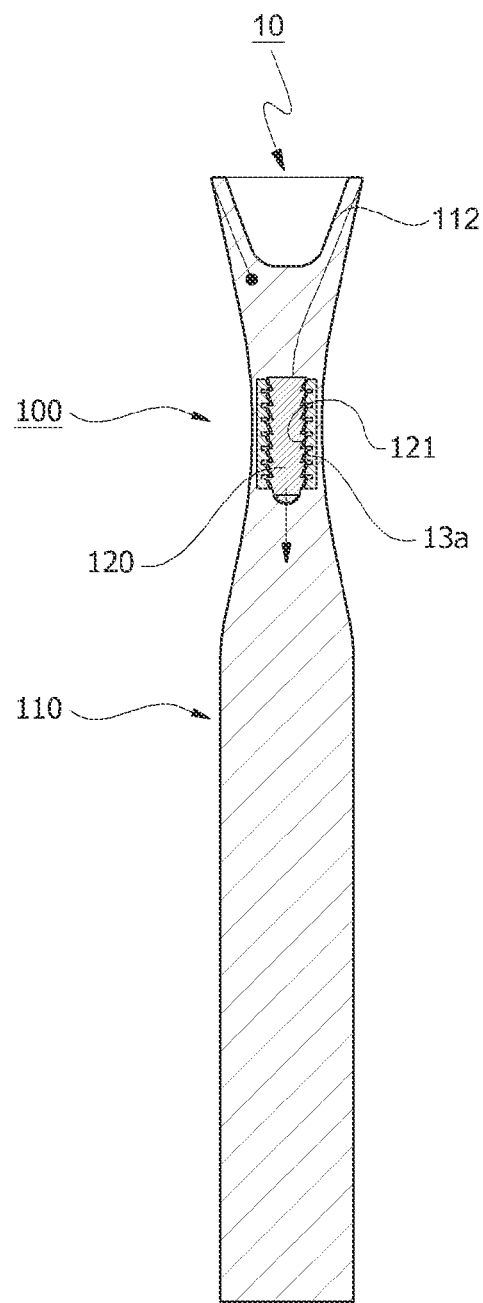
FIG. 10 is a longitudinal cross-sectional view of a state in which the linear dental floss member dental floss holder shown in FIG. 8 is coupled.

FIG. 8 is a first embodiment of a linear dental floss member dental floss holder according to the present disclosure, FIGS. 9A and 9B are exemplary views of a first corresponding fixer of the linear dental floss member dental floss holder according to the present disclosure, and FIG. 10 is a longitudinal cross-sectional view of a state in which the linear dental floss member dental floss holder shown in FIG. 8 is coupled.

A linear dental floss member dental floss holder 100 according to a first embodiment illustrated in FIGS. 8 to 10 is for mounting the dental floss member 10 according to the first embodiment described above.

That is, the linear dental floss member dental floss holder 100 according to the first embodiment has a first corresponding fixer 111 to which the above-described first fixer 12 is fixed, and includes a body 110 having a mounting part 112 on which a section for use of the dental floss 11 is mounted and a second corresponding fixer 120 disposed at the body 110 and to which the second fixer 13 is fixed.

Here, as illustrated in FIGS. 9A and 9B, the first corresponding fixer 111 may have the form of a slot in which the first fixer 12, which is in the form of a holding object, is held and fixed or have the form in which a hole and a slot are combined. A width of the slot is larger than those of the dental floss 11 and the holding object so that the holding object is held and fixed into the slot. In this way, one end of the dental floss member 10 may be firmly fixed to the body 110.

The second corresponding fixer 120 may be in the form of a tunnel outside the body 110, and a corresponding ratchet 121 engaged with the ratchet 13a of the dental floss member 10 according to the first embodiment above may be disposed inside the tunnel.

In this case, the ratchet 13a and the corresponding ratchet 121 have a teeth structure that allows movement of the second fixer 13 in a direction in which the dental floss member 10 is pulled, i.e., a direction away from the mounting part 112, but limits movement of the second fixer 13 in a direction toward the mounting part 112.

Due to such a structure, installation of the dental floss member 10 is completed by press-fitting the first fixer 12 of the dental floss member 10 in the first corresponding fixer 111, mounting the dental floss 11 on the mounting part 112, and then inserting the second fixer 13 into the tunnel of the second corresponding fixer 120.

Then, when the dental floss 11 is loosened due to prolonged use, the pulling part 13b of the second fixer 13 may be used to pull the dental floss 11 downward in the drawing to readjust the dental floss 11 to be tightly mounted as in an initial stage of use. In this way, the dental floss 11 may be continuously used in a tightly-mounted state.

Figure 11:
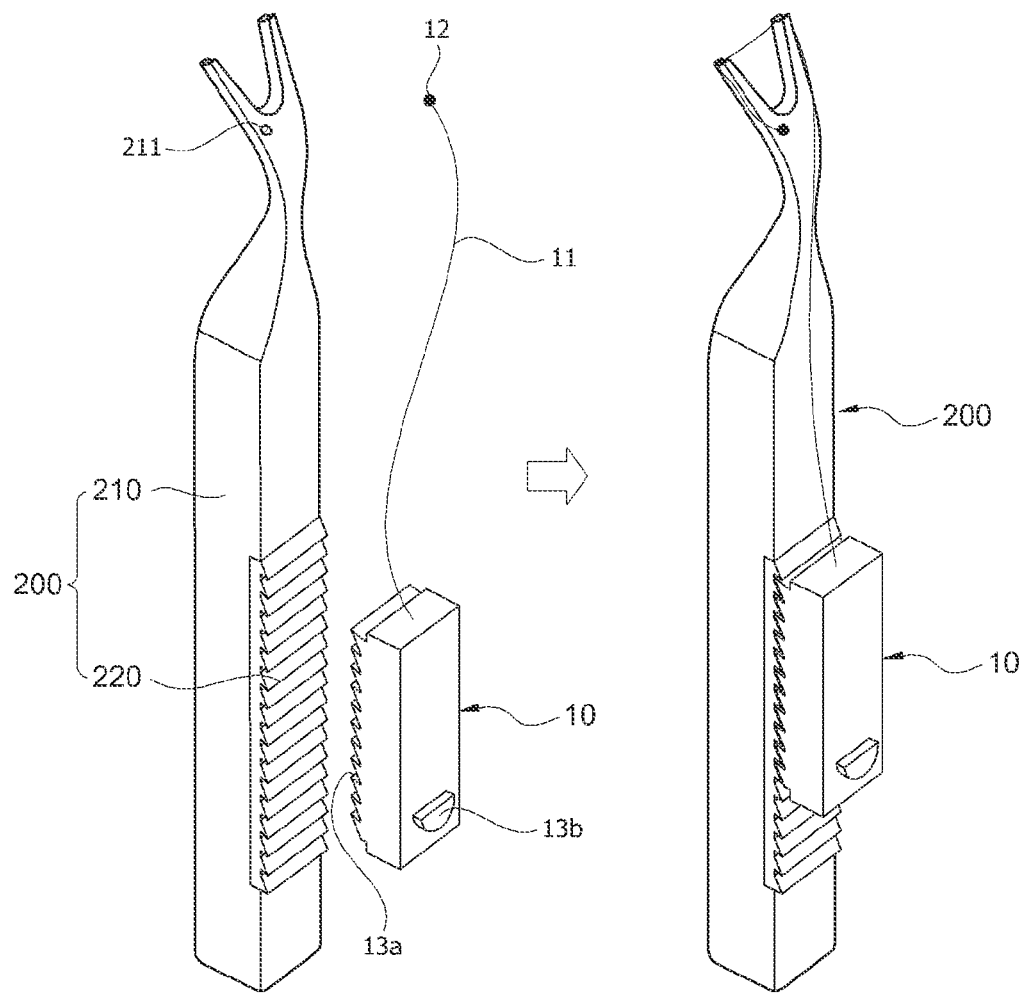
FIG. 11 is a second embodiment of a linear dental floss member dental floss holder according to the present disclosure.

FIG. 11 is a second embodiment of a dental floss holder according to the present disclosure and shows perspective views of states before and after a dental floss member is mounted thereon.

A dental floss holder 200 according to the second embodiment illustrated in FIG. 11 is for mounting the dental floss member 10 according to the second embodiment described above. The dental floss holder 200 is the same as the linear dental floss member dental floss holder 100 according to the first embodiment in that a body 210 having a first corresponding fixer 211 and a second corresponding fixer 220 are included.

However, the dental floss holder 200 is different from the linear dental floss member dental floss holder 100 according to the first embodiment in that the second corresponding fixer 220, which is formed of a corresponding ratchet engaged with the ratchet 13a of the dental floss member 10 according to the second embodiment, is exposed to an outer surface of the body 210 unlike the second corresponding fixer of the linear dental floss member dental floss holder 100 according to the first embodiment.

Figure 12:
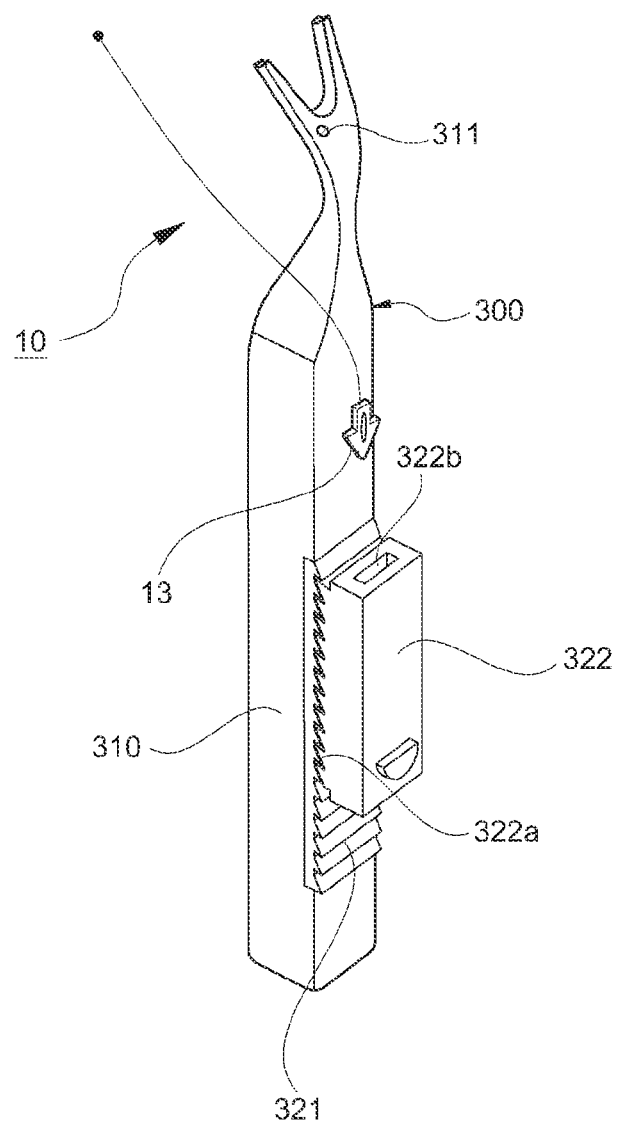
FIG. 12 is a third embodiment of a linear dental floss member dental floss holder according to the present disclosure.

FIG. 12 is a dental floss holder 300 according to a third embodiment, which is for mounting the dental floss member 10 according to the third embodiment above.

That is, a first corresponding fixer 311 of the dental floss holder 300 according to the third embodiment is the same as those according to the previous first and second embodiments, and a second corresponding fixer 320 may have a ratchet part 321 formed on or coupled to a body 310, and a corresponding ratchet 322a engaged with the ratchet part 321, and include an adaptor 322 having a fixing groove 322b, in which the arrowhead-shaped second fixer 13 of the dental floss member 10 according to the third embodiment above is inserted and fixed, formed at one side.

In this case, the ratchet part 321 and the corresponding ratchet 322a have a teeth structure that allows movement of the adaptor 322 in a direction in which the dental floss member 10 is pulled, i.e., a direction away from a mounting part 312, but limits movement of the adaptor 322 in a reverse direction. Since other parts are the same as the first and second embodiments above, detailed descriptions thereof will be omitted.

[Annular Dental Floss Member]

Embodiments of an annular dental floss member according to the present disclosure are classified according to presence of a dental floss tie.

That is, a dental floss member without a dental floss tie (not illustrated) may be classified as a non-knot type dental floss member in which dental floss itself is formed in an annular shape and a knot type dental floss member in which both ends of linear dental floss are tied to each other to form an annular shape.

On the other hand, as illustrated in FIGS. 13 to 16, a dental floss member 20 with a dental floss tie has both ends of an annular dental floss 21 buried in a dental floss tie 22. Both ends may be buried using insert molding.

Figure 13:
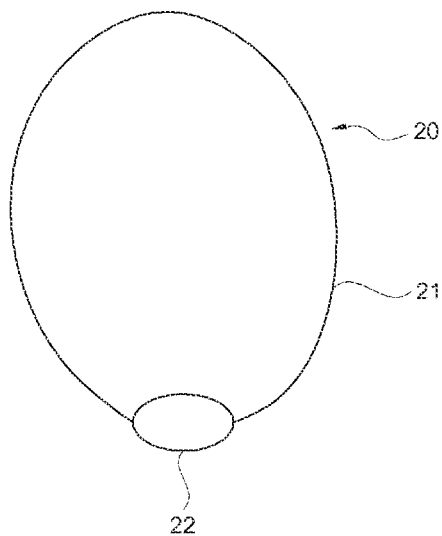
FIG. 13 is a first embodiment of an annular dental floss member according to the present disclosure.

Of the above, the dental floss member 20 of FIG. 13 has both ends of the annular dental floss 21 buried in both side surfaces of the dental floss tie 22 to face each other so that, when the annular dental floss 21 is pulled tightly, the dental floss tie 22 is adhered to a dental floss holder. Further, the dental floss tie 22 has a curved or streamlined outer shape so that a problem in that the dental floss tie 22 gets stuck between teeth when flossing is performed is minimized, and causing of wounds or pain inside the mouth is prevented.

Figure 14:
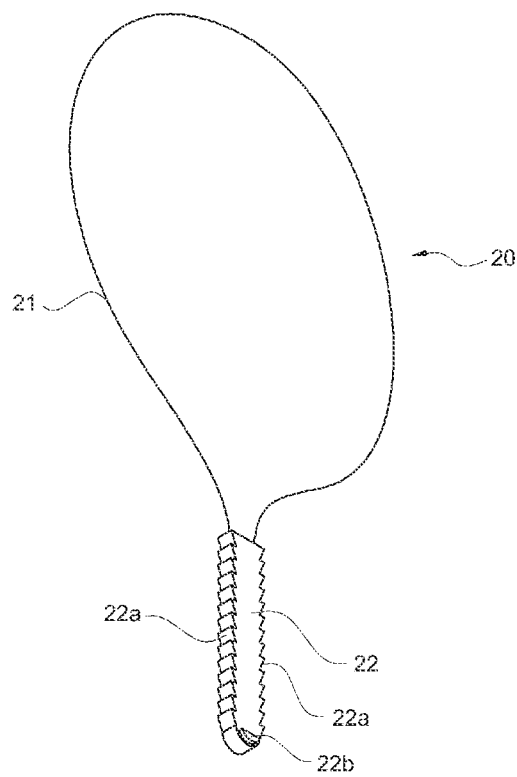
FIG. 14 is a second embodiment of an annular dental floss member according to the present disclosure.
Figure 15:
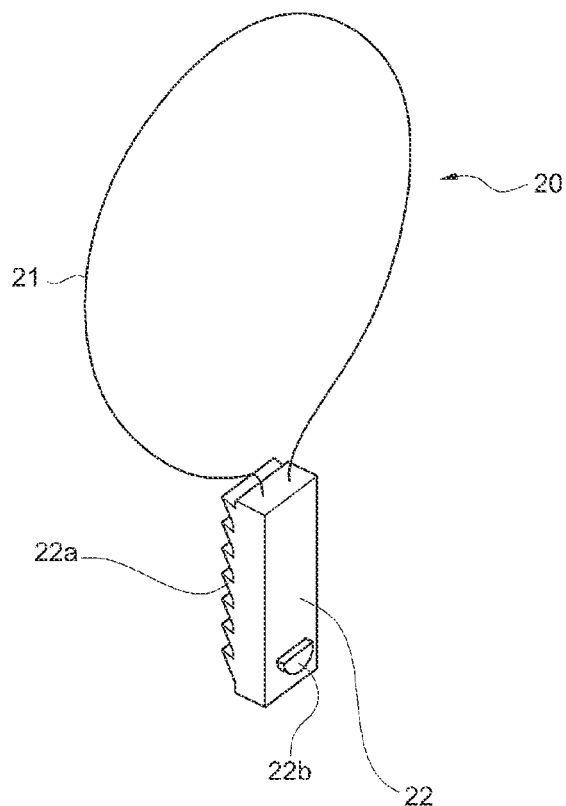
FIG. 15 is a third embodiment of an annular dental floss member according to the present disclosure.

A dental floss member 20 of FIGS. 14 and 15 has a ratchet 22a formed in a length direction of a surface of a dental floss tie 22. Here, the ratchet 22a is to be engaged with a corresponding ratchet of the dental floss holder, which will be described below, and according to the form and position of the corresponding ratchet, the ratchet 22a may be formed on each of both side surfaces of the dental floss tie 22 as shown in FIG. 14 or may be formed on a rear surface of the dental floss tie 22 as shown in FIG. 15.

Furthermore, the dental floss member 20 illustrated in FIGS. 14 and 15 may have a pulling part 22b in the shape of a protrusion or groove so that the dental floss tie 22 may be pulled by a user's finger nail or the like in a direction away from a side at which the annular dental floss is coupled.

Figure 16:
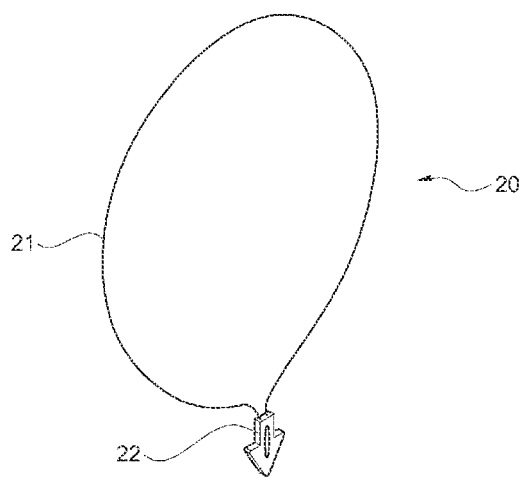
FIG. 16 is a fourth embodiment of an annular dental floss member according to the present disclosure.

A dental floss member 20 of FIG. 16 has a dental floss tie 22 formed in an arrowhead shape. This is to detachably bind the dental floss tie 22 to a fixing groove (not illustrated) formed in a pulling level of a dental floss holder, which will be described below.

[Annular Dental Floss Member Dental Floss Holder]

Figure 17:
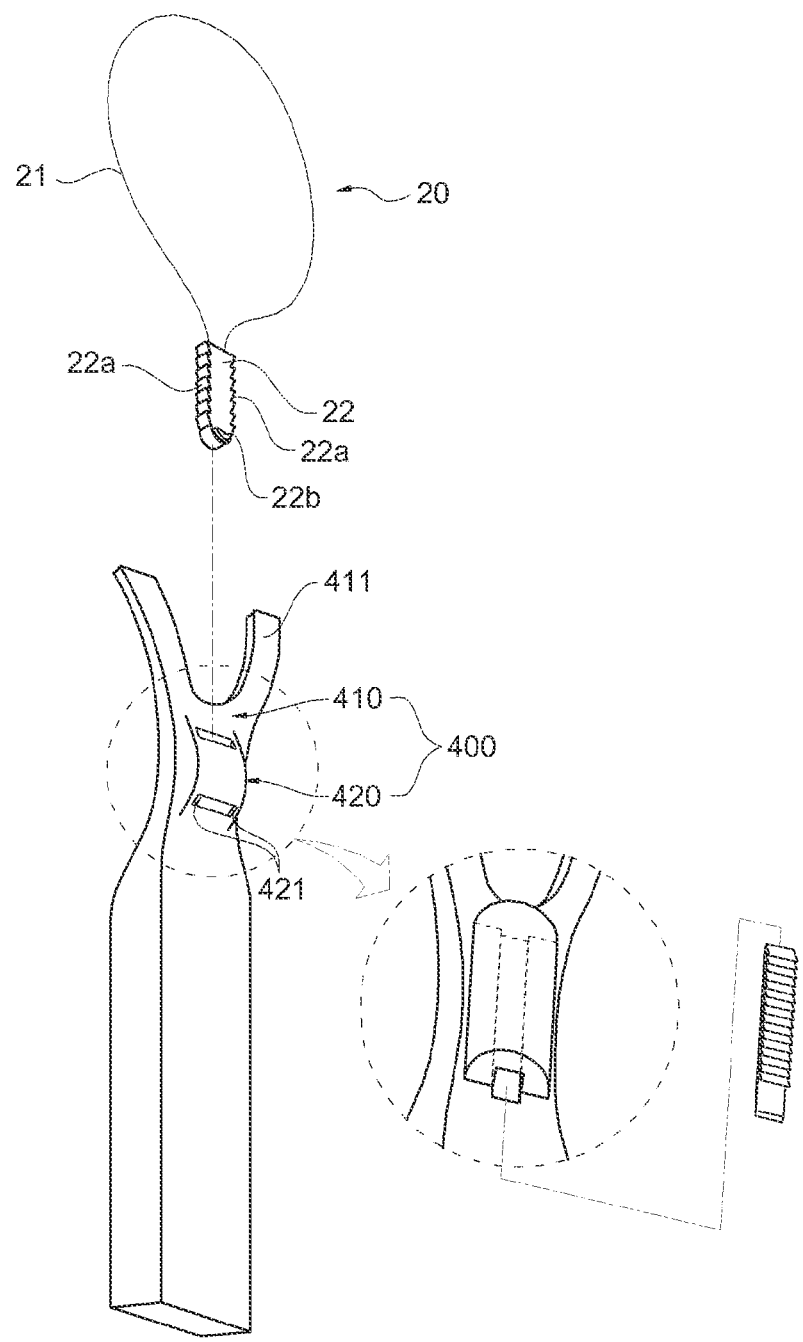
FIG. 17 is a first embodiment of an annular dental floss member dental floss holder according to the present disclosure.
Figure 18:
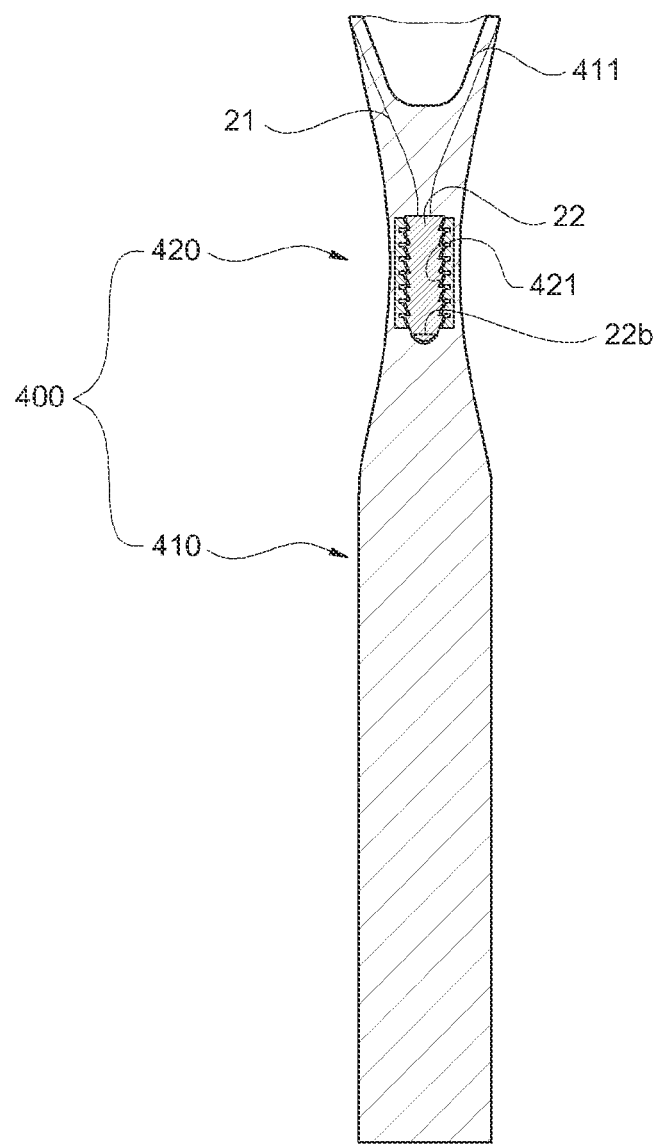
FIG. 18 shows a state in which the annular dental floss member dental floss holder of FIG. 17 is coupled.

FIG. 17 is an exploded perspective view of an annular dental floss member dental floss holder according to a first embodiment, and FIG. 18 is a cross-sectional view illustrating a state in which the annular dental floss member dental floss holder of FIG. 17 is coupled.

Referring to the above drawings, an annular dental floss member dental floss holder 400 according to the first embodiment is a dental floss holder capable of adjusting tension of dental floss, and includes a holder body 410 and a tie fixing part 420.

The holder body 410 has a mounting part 411 for mounting a section for use of the dental floss member 10. Here, the mounting part 411 may have a Y-shape so that the dental floss member 20 may be mounted on a predetermined length, but the shape of the mounting part 411 is not limited thereto.

The tie fixing part 420 is disposed in the holder body 410 and serves to fix the dental floss tie 22.

The tie fixing part 420 may be in the form of a tunnel formed on an outer surface of the holder body 410, and a corresponding ratchet 421 engaged with the ratchet 22a formed on the dental floss tie 22 is disposed inside the tunnel.

Here, the ratchet 22a and the corresponding ratchet 421 have a teeth structure that allows movement of the dental floss tie 22 in a direction in which the dental floss member 20 is pulled, i.e., a direction away from the mounting part 411, but prevents reverse movement by limiting movement of the dental floss tie 22 in a reverse direction.

Due to such a structure, mounting of the dental floss member 20 is completed by inserting the dental floss tie 22 into the tunnel of the tie fixing part 420 while the dental floss member 20 is mounted on the mounting part 411, and when the dental floss member 20 is loosened due to prolonged use, the pulling part 22b of the dental floss tie 22 may be used to pull the dental floss member 20 downward in the drawing to readjust the dental floss member 20 to be tightly mounted and be continuously used in such a state.

Figure 19A:
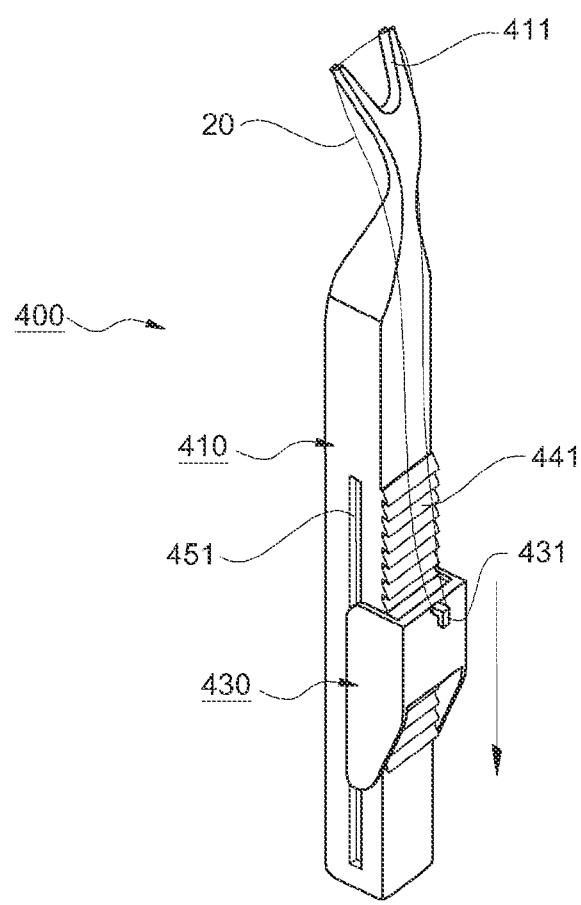
FIGS. 19A, 19B, 19C and 19D illustrate a second embodiment of an annular dental floss member dental floss holder according to the present disclosure.
Figure 19B:
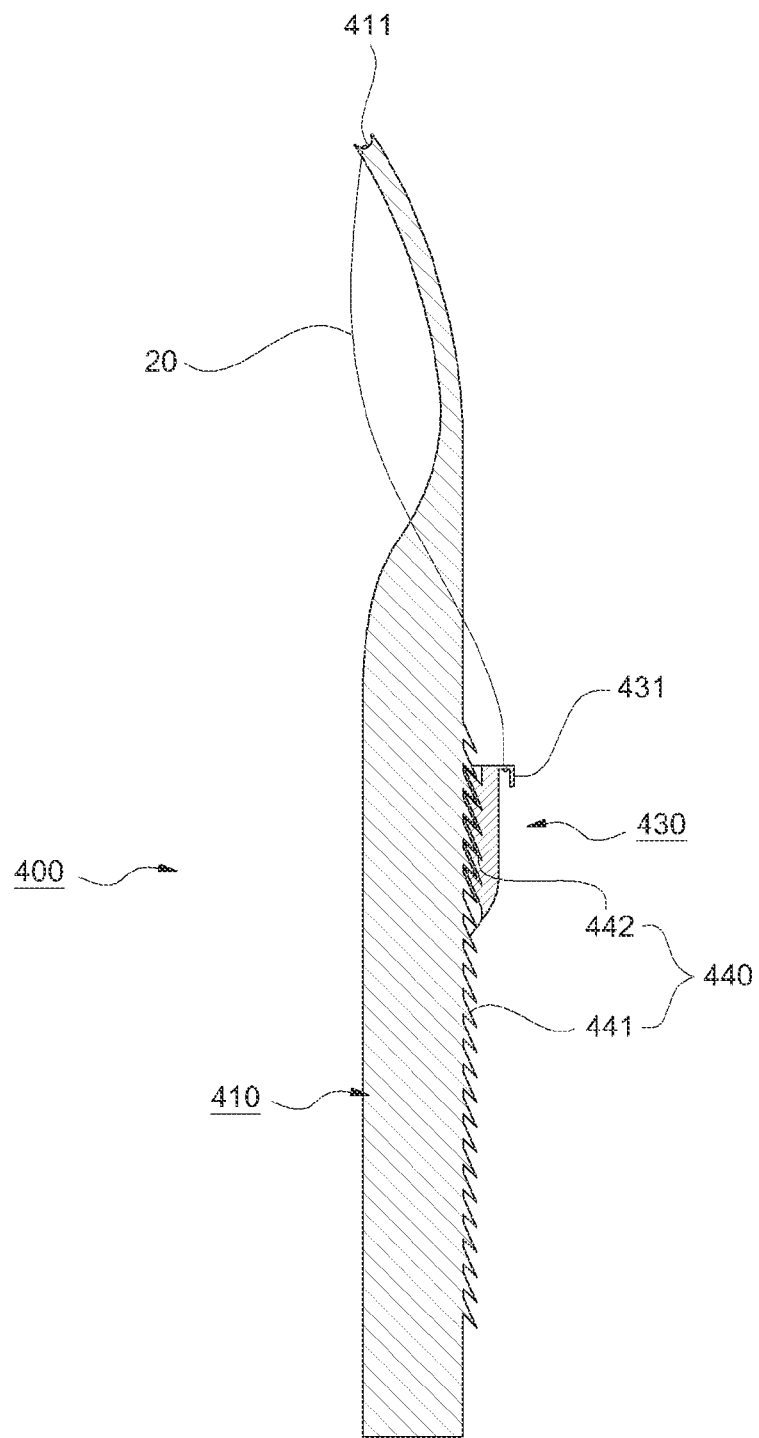
Figure 19C:
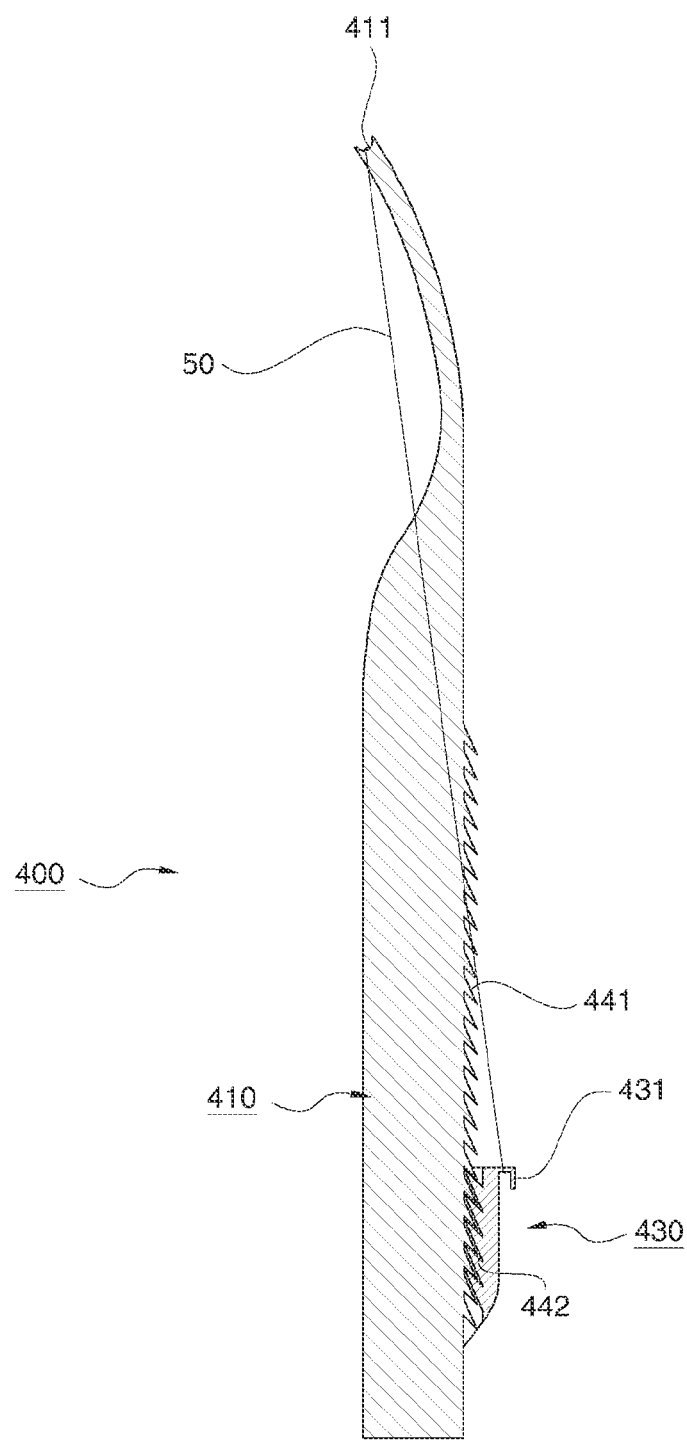
Figure 19D:
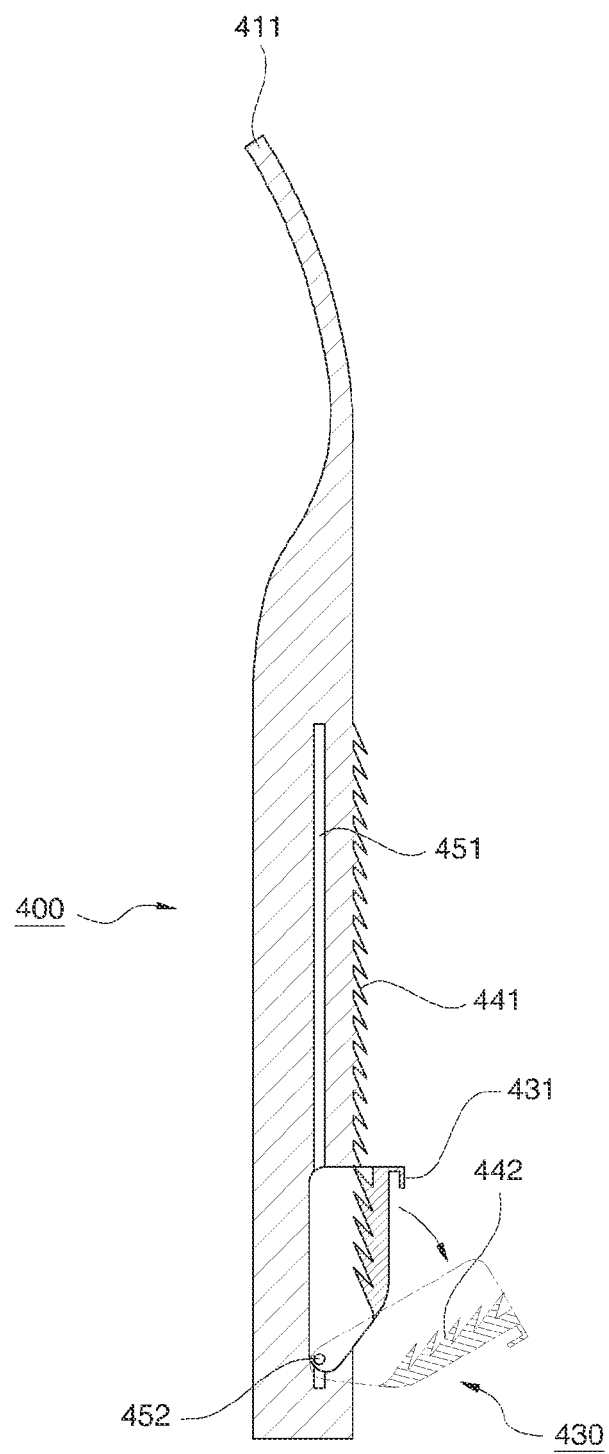

FIG. 19A is a perspective view of a state in which an annular dental floss member dental floss holder according to a second embodiment is coupled, FIG. 19B is a longitudinal cross-sectional view showing a state before the annular dental floss member dental floss holder of FIG. 19A is pulled, FIG. 19C is a longitudinal cross-sectional view showing a state after the annular dental floss member dental floss holder of FIG. 19A is pulled, and FIG. 19D is a longitudinal cross-sectional view showing a state in which a pulling lever of the annular dental floss member dental floss holder of FIG. 19A is pulled backward.

Referring to the above drawings, an annular dental floss member dental floss holder 400 is a dental floss holder capable of adjusting tension of dental floss, and includes a holder body 410, a pulling lever 430, and a reverse movement preventing member 440.

The holder body 410 has a mounting part 411 on which a section for use of a dental floss member 50 is mounted. Here, the mounting part 411 may have a Y-shape so that the dental floss member 50 may be mounted on a predetermined length, but the shape of the mounting part 411 is not limited thereto.

The pulling lever 430 is installed to be movable in a length direction of the holder body 410 and serves to tightly adjust tension of dental floss by pulling a part on which the dental floss member 50 is not mounted.

The pulling lever 430 may include a mounting hook 431 on which one side of the dental floss member 20 is hung and mounted. The position and form of the mounting hook 431 are not limited.

The reverse movement preventing member 440 may include a ratchet 441 disposed at the holder body 410 and a corresponding ratchet 442 disposed at the pulling lever 430 to be engaged with the ratchet 441.

Here, the ratchet 441 and the corresponding ratchet 442 have a teeth structure that allows movement of the pulling lever 430 in a direction in which the dental floss member 20 is pulled, i.e., a direction away from the mounting part 411 (direction indicated by an arrow in FIG. 19A), but limits movement of the pulling lever 430 in a reverse direction to prevent reverse movement.

Due to such a structure, the dental floss member 20 is used by one side of the dental floss member 20 being mounted on the mounting part 411 and the other side thereof hung and fixed onto the mounting hook 431, and when the dental floss member 20 is loosened due to prolonged use, the pulling lever 430 may be pulled downward to readjust the dental floss member 20 to be tightly mounted and be continuously used in such a state.

The annular dental floss member dental floss holder 400 according to the second embodiment may further include a deviation preventing member 450 for preventing deviation of the pulling lever 430 and facilitating movement of the pulling lever 430.

The deviation preventing member 450 may include a deviation preventing groove 451 formed in a length direction on both side surfaces of the holder body 410, and a deviation preventing protrusion 452 which is formed on a surface corresponding to that in which the deviation preventing groove 451 of the pulling lever 430 is formed, to be fitted and coupled to the deviation preventing groove 451.

Unlike this, a deviation preventing protrusion may be formed on the holder body 410, and a deviation preventing groove may be formed on the pulling lever 430.

As illustrated in FIG. 19D, the deviation preventing protrusion 452 is disposed to be leaned toward a lower end of the pulling lever 430 so that an upper portion of the pulling lever 430 is rotated in a direction receding from the holder body 410 with the deviation preventing protrusion 452 as a hinge point. According to such a structure, because an engagement relationship between the ratchet 441 and the corresponding ratchet 442 may be released, the pulling lever 430 may be moved in a reverse direction. This may be useful when replacing the dental floss member 20 with a new one.

Figure 20:
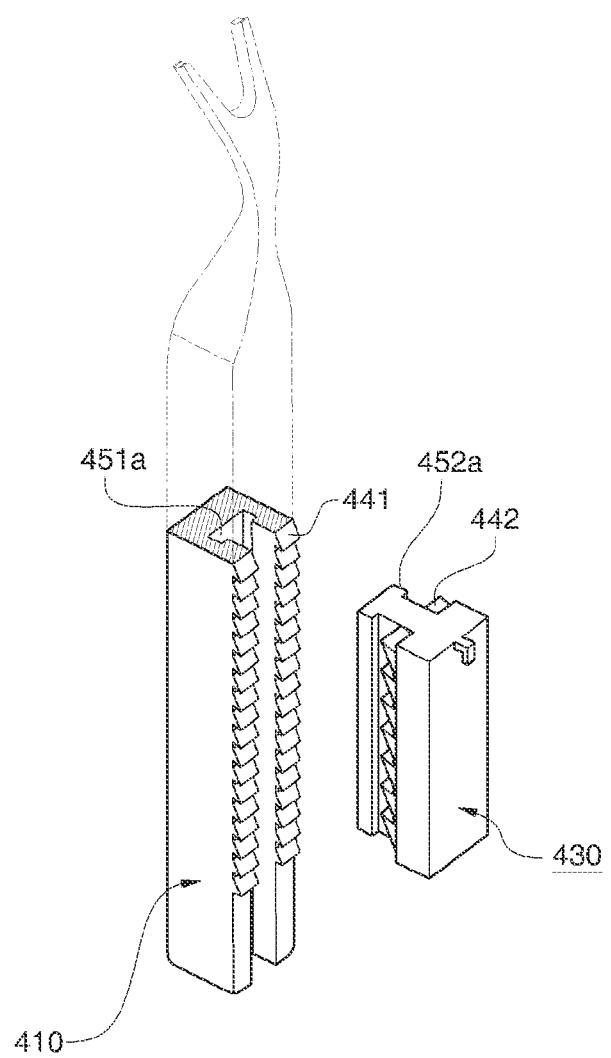
FIG. 20 is a deviation preventing member according to another embodiment.

FIG. 20 illustrates another embodiment of the deviation preventing member 450, which includes a deviation preventing groove 451a formed in a length direction on a central portion of the holder body 410 and a deviation preventing protrusion 452a, in the form of a rail that is inserted into the deviation preventing groove 451a and slid in the length direction, formed on a corresponding surface of the pulling lever 430. Any configuration other than above may belong to the scope of the present disclosure as long as the pulling lever 430 may slide along the holder body 410.

Figure 21:
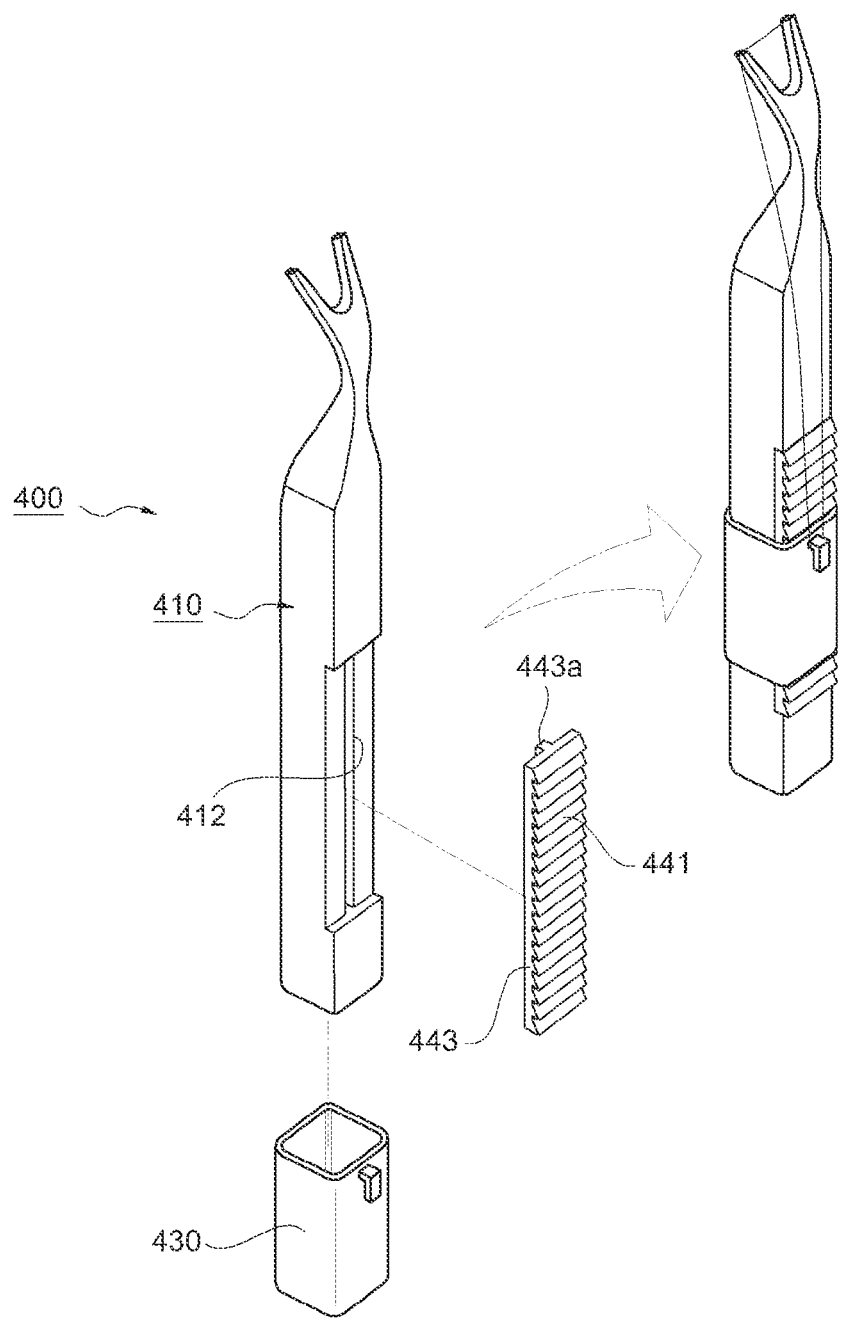
FIG. 21 is a modification of the annular dental floss member dental floss holder according to the second embodiment.

FIG. 21 is a modification of the annular dental floss member dental floss holder of the second embodiment. First, the ratchet 441 of the reverse movement preventing member 440 may be integrally formed with the holder body 410 as in the previous drawing or may be formed at a separate ratchet plate 443 which may be attached to or detached from the holder body 410.

Here, a structure in which a fitting protrusion 443a is formed at the ratchet plate 443 and an insertion groove 412 into which the fitting protrusion 443a is inserted is formed at a corresponding surface of the holder body 410 for fitting and coupling the ratchet plate 443 and the holder body 410 may be proposed or, although not illustrated, a method of fastening by screws may also be applied.

Further, although not separately illustrated, a configuration in which the corresponding ratchet 442 of the reverse movement preventing member 440 is formed at a separate corresponding ratchet plate and the ratchet plate is coupled to the pulling lever 430 may also be applied.

The configurations in which the ratchet and the corresponding ratchet are separately formed are necessary when the pulling lever 430 is moved backward to replace the dental floss member 20, and allow the ratchet or the corresponding ratchet to be partially replaced when damaged, thereby being more economically feasible compared to when the ratchet and the corresponding ratchet are integrally formed.

The pulling lever 430 may be formed in a cylindrical shape to surround an outer peripheral surface of the holder body 410. In this way, the deviation preventing groove in the second embodiment is not necessary, and depending on the design of the holder body, the pulling lever 430 may also serve as a cover when the holder body is used as a dental floss storage space.

Figure 22A:
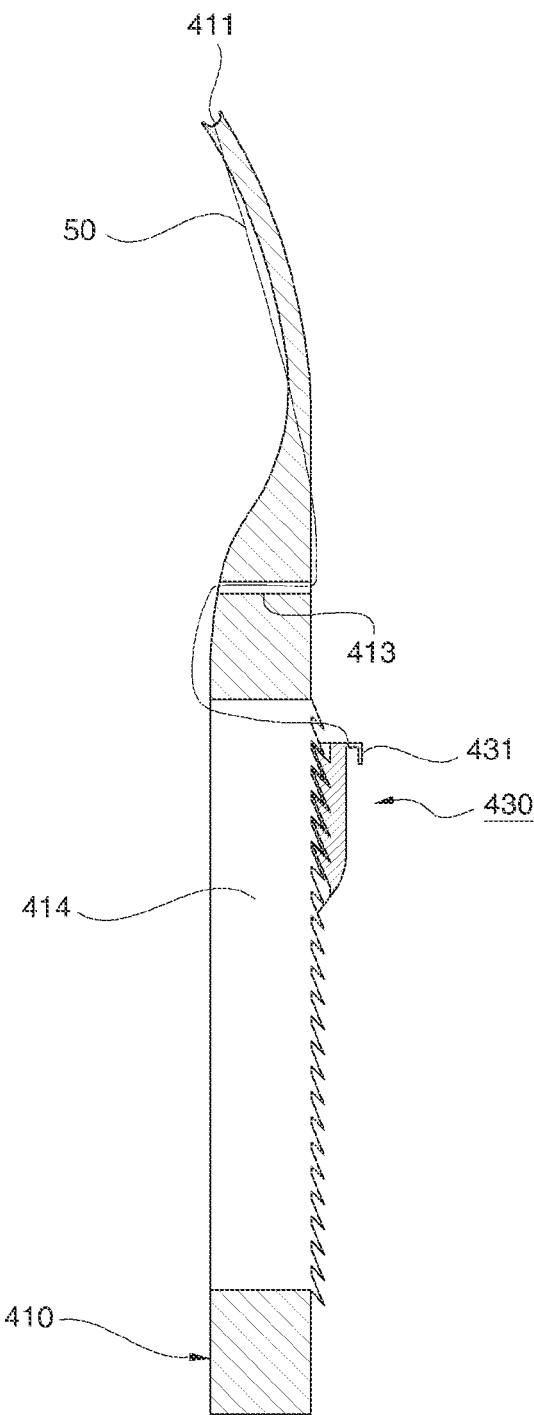
FIG. 22A shows another mounting form of the annular dental floss member and shows a state before the annular dental floss member is pulled.
Figure 22B:
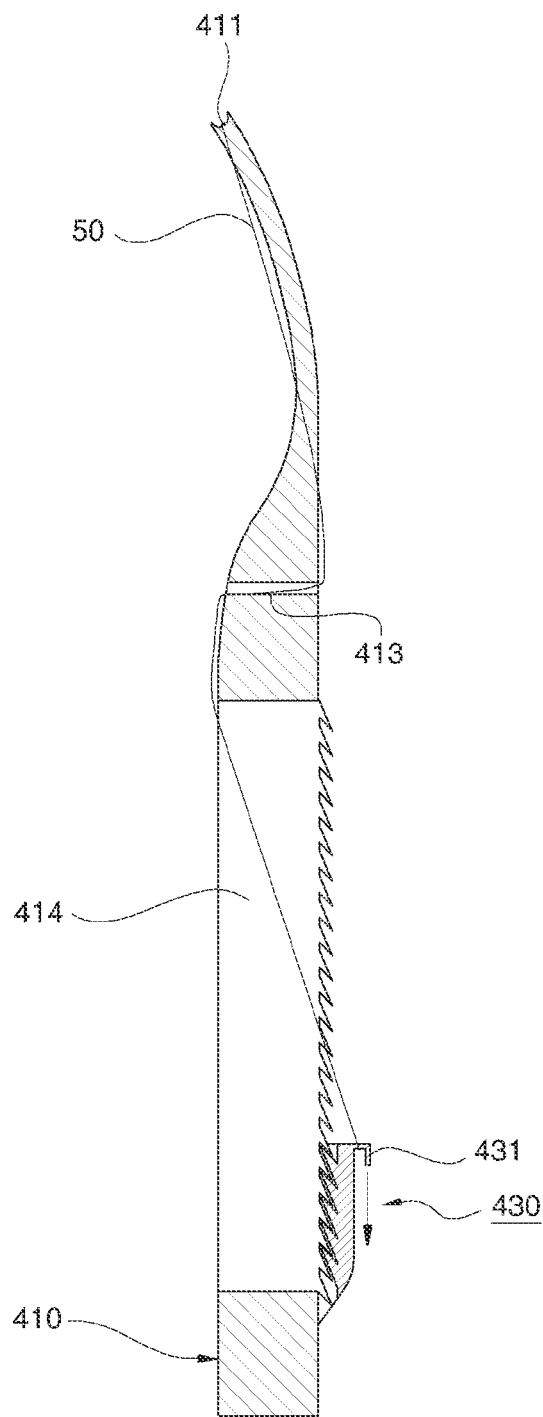
FIG. 22B shows a state after the annular dental floss member of FIG. 22A is pulled.

FIG. 22A is a view illustrating another mounting form of a dental floss member and shows a state before the dental floss member is pulled, and FIG. 22B shows a state after the dental floss member of FIG. 22A is pulled.

Referring to the above drawings, a first through-hole 413 passing through front and rear portions of the holder body 410 is formed between the mounting part 411 and the ratchet 441 of the holder body 410, and a second through-hole 414 passing through front and rear portions of a section in which the ratchet 441 is formed such that, as shown in FIG. 22A, one side of the dental floss member 20 is mounted on the mounting part 411, and the other side thereof is passed through the first through-hole 413 from the front toward the rear and passed through the second through-hole 414 from the rear toward the front to hang and fix the dental floss member 20 on the mounting hook 431 of the pulling lever 430.

Then, when the pulling lever 430 is pulled downward as shown in FIG. 22B, because the pulling lever 430 is pulled toward the holder body 410 by the dental floss member 20, deviation of the pulling lever 430 may be prevented.

Figure 23A:
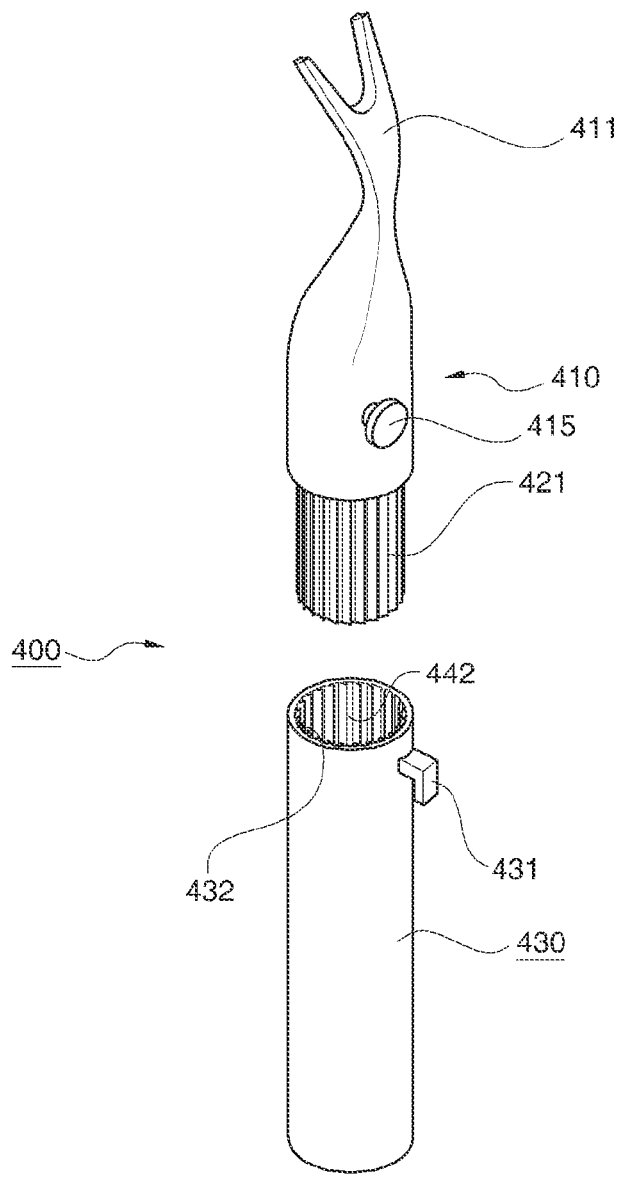
FIGS. 23A, 23B and 23C illustrate a third embodiment of an annular dental floss member dental floss holder according to the present disclosure.
Figure 23B:
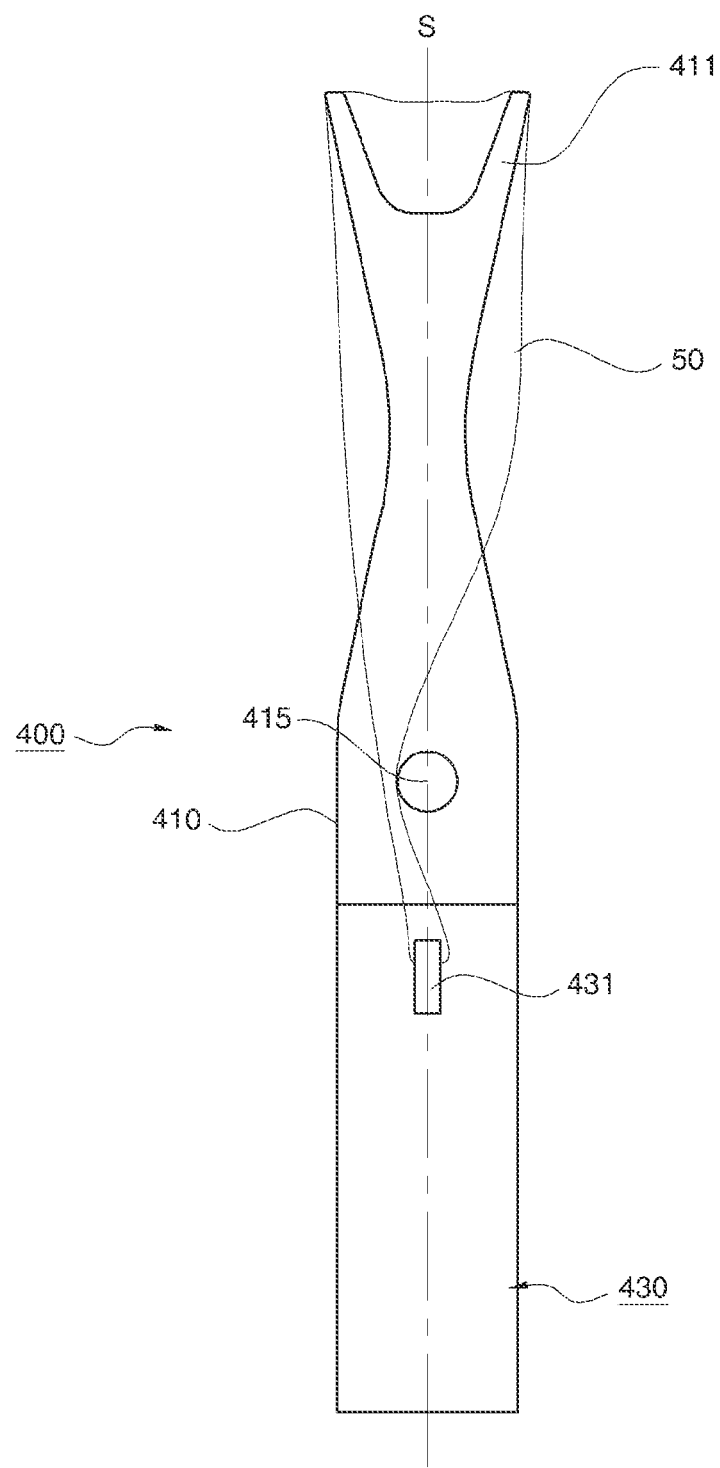
Figure 23C:
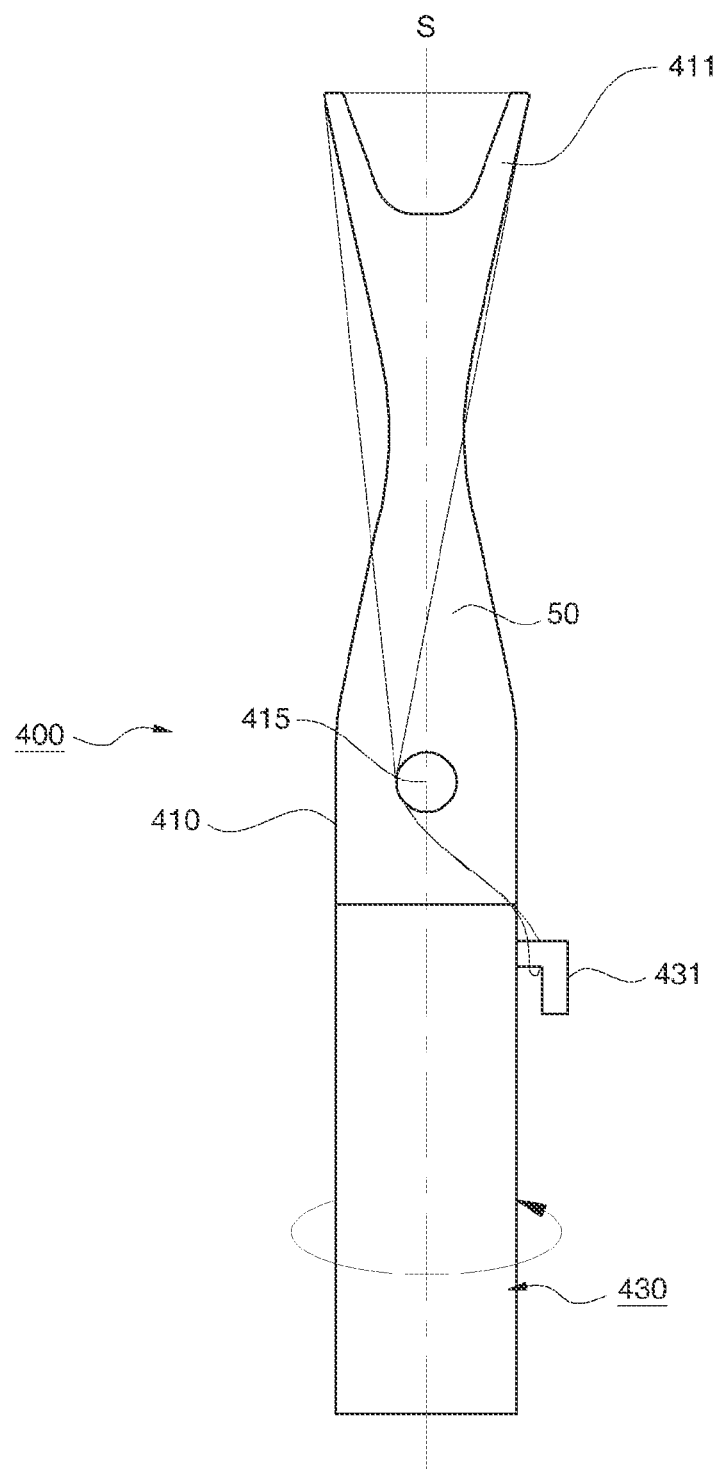

FIG. 23A is an exploded perspective view illustrating a third embodiment of an annular dental floss member dental floss holder, FIG. 23B is a view illustrating a state in which the annular dental floss member dental floss holder of FIG. 23A is coupled and shows a state before the dental floss member is pulled, and FIG. 23C is a view illustrating a state in which the annular dental floss member dental floss holder of FIG. 23A is coupled and shows a state after the dental floss member is pulled.

Referring to the above drawings, configurations of the annular dental floss member dental floss holder 100 according to the third embodiment are the same as those of the second embodiment except that the pulling lever 430 is operated by rotation, and accordingly the ratchet 441 and the corresponding ratchet 442 are formed in an annular shape.

That is, the other end of the mounting part 411 of the holder body 410 is formed in a cylindrical shape, the ratchet 441 is formed in an annular shape along a surface of the cylindrical shape, an insertion groove 432 into which the cylindrical portion is inserted is formed in the pulling lever 430, and the corresponding ratchet 442 engaged with the ratchet 441 is formed along an inner peripheral surface of the insertion groove 432.

Due to such configurations, the pulling lever 430 may be rotated in one direction about an axial line s of the holder body 410 to operate the dental floss member 20 mounted on the mounting hook 431 of the pulling lever 430 to be pulled in a circumferential direction of the pulling lever 430 so that the dental floss member 20, which is loosened, is adjusted to be tight.

The annular dental floss member dental floss holder 400 according to the third embodiment may have a winding protrusion 415 formed at a predetermined position on an outer peripheral surface of the holder body 410. The winding protrusion 415 serves to allow the dental floss member 20 to be pulled instead of being rotated when the pulling lever 430 is rotated.

Since the dental floss member according to the present disclosure can easily be mounted on a dental floss holder, tension thereof can be easily adjusted while the dental floss member is mounted, and the dental floss member can be used independently, the dental floss member can be commercialized as individual items.

Since the dental floss member according to the present disclosure can be used while tension thereof is adjusted corresponding to a user's dental conditions, and tension of dental floss can be readjusted to be tight when the dental floss is loosened after repeated use, effectiveness and usability of the dental floss can be improved.

Although specific embodiments of the present disclosure have been described in detail above, the embodiments are merely for describing the present disclosure in detail, the present disclosure is not limited by the embodiments, and it should be apparent that the present disclosure may be changed or modified by those of ordinary skill in the art within the technical spirit of the present disclosure.

Simple modifications and changes of the present disclosure all belong to the scope of the present disclosure, and the specific scope of the present disclosure will become apparent by the attached claims below.

What is claimed is:
1. A dental floss member comprising:
   a dental floss having a proximal end, a distal end, and a predetermined length;
   a first fixer disposed at the proximal end of the dental floss, the first fixer being spherical and having a thickness larger than that of the dental floss and configured to be fixed into a slot provided on a dental floss holder; and
   a second fixer disposed at the distal end of the dental floss, the second fixer comprising:

a top surface defining a proximal end of the second fixer, the top surface being planar, an opposing arcuate bottom surface defining the distal end of the second fixer, a front face extending between the top surface and the bottom surface, the front face being planar and having a groove or an arcuate protrusion disposed thereon, such that during use, the groove or arcuate protrusion is used to pull the dental floss, a back face opposite the front face and extending between the top surface and the bottom surface, and first and second side faces, each disposed between the front and back face, respectively, and extending between the top surface and the bottom surface, a first row of teeth protruding from the first side face and a second row of teeth protruding from the second side face;

wherein each tooth of the first row of teeth comprises:
    a first triangular face having a bottom edge coincident with the first side face and the front face,
    a second triangular face having a bottom edge coincident with the first side face and the back face,
    a first rectangular face extending between the first and second triangular faces, the first rectangular face being inclined and having a bottom edge coincident with the first side face, and an upper edge,
    a second rectangular face having a bottom edge coincident with the first side face and an upper edge coincident with the upper edge of the first rectangular face wherein the second rectangular face defines a proximal end of each tooth and the bottom edge of the first rectangular face defines a distal end of each tooth such that each first rectangular face is oriented in the same direction, and wherein each tooth of the second row of teeth comprises:
    a first triangular face having a bottom edge coincident with the second side face and the front face,
    a second triangular face having a bottom edge coincident with the second side face and the back face,
    a first rectangular face extending between the first and second triangular faces, the first rectangular face being inclined and having a bottom edge coincident with the second side face, and an upper edge,
    a second rectangular face having a bottom edge coincident with the second side face and an upper edge coincident with the upper edge of the first rectangular face;

the second rectangular face of each first tooth of the first and second rows of teeth extend continuously from the top surface such that the bottom edges of the first teeth are coincident with a respective edge of the top surface and a respective terminal edge of the first and second side surfaces, wherein the first and second rows of teeth define a ratchet, and wherein teeth of the first and second rows of teeth are configured to engage with corresponding teeth of a corresponding ratchet of a dental floss holder such that during use, the second fixer is pulled in a direction away from the top surface, such that the ratchet having, when engaged with a corresponding ratchet of the dental floss holder, a teeth structure that allows movement of the second fixer in the direction in which the dental floss member is pulled, and limits movement of the second fixer in the opposite direction, thereby providing a function of adjusting a tension of the dental floss by pulling the dental floss member using a single contact with the second fixer.

* * * * *